INVENTOR
A. J. GIGER
BY [signature]
ATTORNEY

EQUIVALET CIRCUIT OF FIG. 2 WHEN GATE 3 IS CLOSED

EQUIVALET CIRCUIT OF FIG. 2 WHEN GATE 5 OR 6 IS CLOSED

INVENTOR
A. J. GIGER
BY T. W. Adams, Jr.
ATTORNEY 3,201,716

PLURAL CHANNEL SWITCHING SYSTEM WITH IMPEDANCE OF ON GATE AND OFF GATES FORMING A BANDPASS FILTER

Adolf J. Giger, Springfield, N.J., assignor to Bell Telephone Laboratories, Incorporated, New York, N.Y., a corporation of New York
Filed Mar. 28, 1961, Ser. No. 98,853
8 Claims. (Cl. 333—3)

This invention relates to an electronic switching device and more particularly to a high speed switch for selectively interconnecting a very high frequency input transmission line and a plurality of similar output lines without the introduction of undesirable signal distortion.

The transmission capability of a coaxial line or other transmission line is partly determined, and ordinarily limited, by the load connected to it. Thus a load, such as the input to a switch, for example, acts as a capacitance and together with the characteristic impedance of the line forms a low-pass filter. Obviously with such a filter a limit is placed on the highest frequency the line can carry. This limitation is of special importance in the VHF and UHF regions. Furthermore, any discontinuity, or impedance mismatch, in the transmission line will produce standing waves on the line and increase the reflection loss. To overcome the effects of high frequency transmission degradation and impedance mismatching, special consideration must be given to the types of apparatus used in circuits associated with such transmission lines. Accordingly, such apparatus, in addition to having a negligible capacitance, must also have a characteristic impedance equal to that of the transmission line.

The problems are of particular difficulty where switching equipment is added to permit alternative use of several transmission channels in microwave transmission system. Conventional relays and semiconductor switches are objectionable for use at very high frequencies because of the aforementioned capacitance effect and, furthermore, the loss due to both impedance mismatch and the high rate of leakage current inherent in such devices at high frequencies. In addition to the stray capacitance contributed by wiring, the semiconductors themselves have a capacity associated with them which is inherent in the element and cannot be reduced.

It is the object of the present invention to improve switching devices peculiarly adaptable for use in very high frequency transmission systems by reducing or eliminating losses due to capacitive effects and mismatch regardless of the number of channels the switch services.

In accordance with the present invention the transmission line switching device comprises a number of gates and interconnecting networks. The gates comprise asymmetrical conducting devices, such as semiconductor diodes, in an arrangement which in the ON state represents a low loss T pad having the characteristic impedance of the transmission line and which in the OFF state represents a high impedance to the signal and has an impedance characteristic similar to that of a parallel RLC network. The interconnecting networks each comprises an input arm, a shunt arm and a number of output arms, all the arms containing reactive elements. Each output arm is connected to the input of a gate. At any one time only one gate is in the ON state while the other gates connected to the interconnecting network are in the OFF state. The impedances of the OFF gates are reflected into the shunt arm of the interconnecting network while the ON gate terminates the network in a characteristic impedance which is the same as the characteristic impedance of the line with which the switch is associated, thereby forming a bandpass filter. By virtue of the provision of this bandpass structure, the highest frequency which can be transmitted through the switch is increased and the transmission and impedance match is optimized over the width of the bandpass. The capacities of the terminating elements (gates) are, of course, taken into consideration when the values of the elements comprising the bandpass filter are chosen.

If initially a switch with a reduced number of gates is needed, due, for example, to the only partial equipment of service channels, means are provided to replace those gates with reactive elements having an impedance equal to that of an OFF gate. Thus the shunt arm impedance of the bandpass structure is always maintained at the correct value of impedance for proper operation.

The above and other features of the present invention will become more apparent from the following description taken in conjunction with the drawings in which.

The switches of the present invention can be used, for example, in various high frequency radio transmission systems wherein one of a plurality of outputs is to be connected to an input source of signal energy or one of a plurality of inputs is to be connected to an output. Such a transmission system is described in the copending application by F. S. Farkas, Serial No. 344, filed January 4, 1960 and assigned to the assignees of the present application. In the system described in that application it is noted that the transmitting and receiving switches are shown in generalized form as simple relays. The present invention provides transmitting and receiving switches suitable for performing the indicated functions as shown in partial block and schematic diagram form in FIGS. 1A and 1B to thereby extend the frequency limit of the system.

Figure 1A:
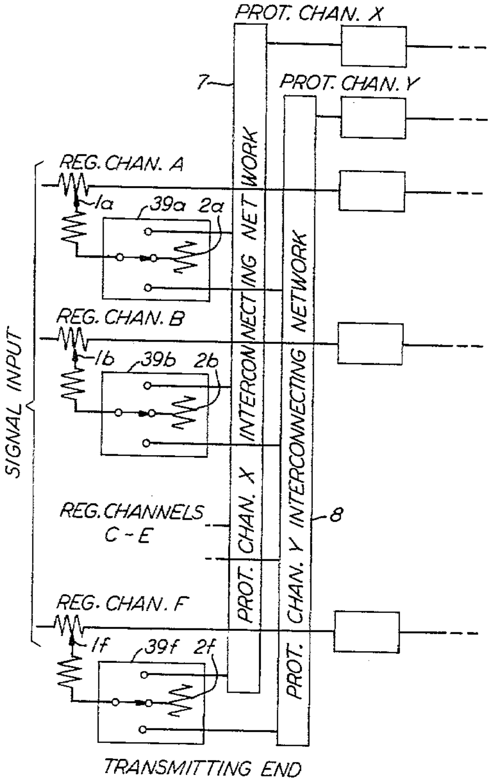
FIGS. 1A and 1B are schematic representations in block diagram form of a radio transmission system in which switch circuits in accordance with this invention may be employed.
Figure 1B:
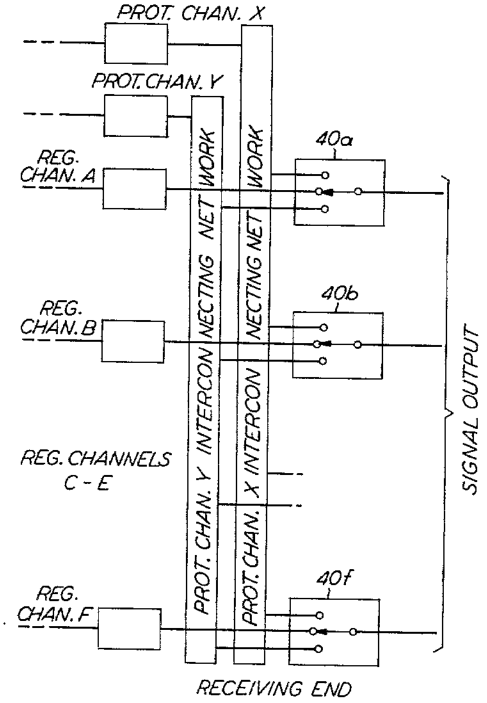

As shown in FIG. 1A, the taps *1a* through *1f* from channel inputs A through F are normally terminated through switches *39a*–*39f* in the characteristic impedances *2a* through *2f*. In FIG. 1B the signal normally received on each channel is transmitted through switches *40a*–*40f* to the receiving equipment. If a channel fails a switch will be made to change the signal at the regular channel tap from the normally terminated position to either protection channel X or Y. The corresponding receiving switch will thereupon be set to receive the signal over either protection channel X or Y depending upon which channel is utilized. For a detailed explanation of this automatic protection switching system one is referred to the aforementioned Farkas application.

By way of example, the switches of the present invention will be described as they might be employed at the transmitting end of the above-described transmission system. It is obvious that the operation is similar for the receiving end.

Each switch comprises a plurality of gate circuits and at least one interconnecting network. These are shown in diagrammatic form in FIG. 2 in which the gates are represented by single-pole, single-throw devices 3, 5 and 6, which in the ON state are closeed and in the OFF state are open and the interconnecting network is shown at 42. If several switches are interconnected, as is the case when the switches of the invention are employed in a protection switching system of the kind shown in FIGS. 1A and 1B, additional interconnecting networks such as protection channel interconnecting networks 7 and 8 (FIG. 2) are required.

Figure 2:
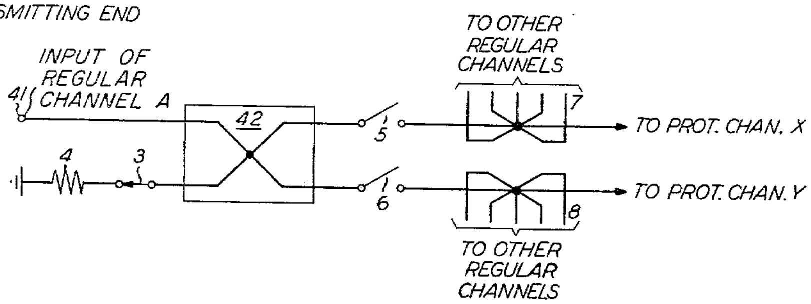
FIG. 2 is a schematic diagram of the switching network of the present invention.

In the switch shown in FIG. 2, the output of gate 3 is connected to a resistor 4 which represents an impedance equal to the characteristic impedance of the channel transmission lines. The outputs of gates 5 and 6 are connected to protection channel interconnecting networks 7 and 8, the outputs of which are connected to protection channels X and Y, respectively. The networks 7 and 8 interconnect the gates of all switches connected to the particular protection channels. The inputs of the gates 3, 5 and 6 are connected together by individual output arms of network 42. Terminal 41 of network 42 is connected to the source of signal energy such as the channel transmission line. It will be evident that if only one regular channel is involved, the protection channel interconnecting networks, 7 or 8, will not be required.

Figure 3:
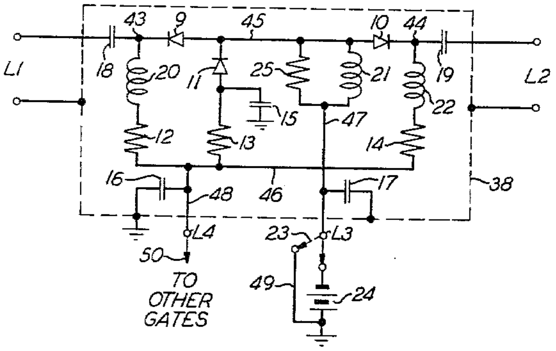
FIG. 3 is a circuit diagram of a gate as employed in the switching network of FIG. 2.

An individual gate of the kind represented at 3, 5 and 6 in FIG. 2 comprises a number of asymmetrical conducting devices in a T arrangement as shown in FIG. 3. The direction of the arrowhead in the symbol for the asymmetrical device indicates the low resistance direction of current flow through the device. In the embodiment semiconductor diodes are utilized as the asymmetrical conducting elements. However, any element having the same characteristics may be used.

The input signal is introduced at terminals $L_1$ and the output signal is taken from terminals $L_2$. Capacitors 18 and 19 are connected to the upper terminals of terminal pairs $L_1$ and $L_2$, respectively, and prevent the direct-current control bias from entering the transmission line and interfering with the signal thereon.

The cathodes of series diodes 9 and 10 are connected, by leads 43 and 44, respectively, to capacitors 18 and 19, respectively. Lead 45 conects the anodes of 9 and 10. In the ON state of the gate, diodes 9 and 10 are in their low impedance state and provide the series impedance of the T pad as described hereinbelow. The cathode of shunt diode 11 is connected to lead 45; the anode of shunt diode 11 is connected to the circuit comprising current limiting resistor 13, and by-pass capacitor 15 which is connected to ground.

Radio frequency chokes 20, 21 and 22 are connected to leads 43, 45 and 44, respectively, and provide a high impedance to the alternating-current signal and prevent the signal from interfering with the direct-current bias. The other ends of chokes 20 and 22 are connected to current limiting resistors 12 and 14, respectively, which are connected to resistor 13 by common lead 46. Lead 46 is connected to the terminal $L_4$ by lead 48. Shunt resistor 25 is connected to lead 45 and placed in parallel with choke 21. This resistor presents a low value of impedance to the signal in comparison with the impedance presented by choke 21. The parallel circuit of 21 and 25 is connected to terminal $L_3$ by lead 47.

Shunted between leads 47 and ground and 48 and ground are by-pass capacitors 17 and 16, respectively, which provide a low impedance path for the alternating-current signal to ground. The gate may be surrounded by metal shield 38 to prevent leakage between respective gates of a switch.

The direct-current bias for control of the gate is connected to terminals $L_3$ and $L_4$. A switch, shown in the drawing as a double-pole, single-throw switch 23, may be connected to terminal $L_3$ to introduce the bias into the gate. One pole is connected to ground through lead 49, while the other pole is connected to the negative side of battery 24. Terminal $L_4$ is connected to terminals $L_4$ of the other gates by lead 50. Although a mechanical switch is shown for purposes of description, it will be obvious that any switching device or circuit providing the requisite direct-current output levels may be employed.

Thus as shown in FIG. 3, with switch 23 connected to 49 as shown by the dotted line, the gate is connected to ground thereby placing the gate in the ON state by causing a positive current to flow through diodes 9 and 10 as explained below with reference to FIG. 7.

In the ON state diodes 9 and 10 will conduct current and present a low impedance to the signal energy applied at terminals $L_1$ while choke 20 will provide a high impedance to the signal. The impedance of the parallel combination of the back-biased diode 11, choke 21 and the low value resistor 25 will be determined by the value of resistor 25 as both choke 21 and back-biased diode 11 have extremely high impedance with respect to the signal energy. Likewise elements 20 and 22 will have high impedance and may be neglected. Thus the signal will encounted a T network with series arms comprising the low forward resistance value of diodes 9 and 10 and the shunt arm comprising the resistance of element 25. Since the characteristic impedance of a T pad is dependent, in part, upon the value of the shunt impedance, the characteristic impedance of this T pad can be determined by the value of resistor 25. With the forward resistance of diodes 9 and 10 fixed by the type of diodes used, the impedance of the gate may be made equal to the characteristic impedance of the transmission line by choosing the correct value of shunt resistor 25.

In the OFF state, terminal $L_3$ is connected to the negative terminal of battery 24 through switch 23, as shown by the solid line, thereby back-biasing diodes 9 and 10 and biasing diode 11 into conduction. The capacitances inherent in diodes 9 and 10, due to the fact they are in their nonconducting state, are of such a value that a high impedance will be presented to the signal at terminals $L_1$. Thus a high loss will be introduced between terminals $L_1$ and $L_2$. In the OFF state the gate impedance seen at terminals $L_1$ or $L_2$ may be represented by a parallel LC network with the capacitance made up of diode and stray capacity and the inductance due to chokes 20 or 22.

Figure 7:
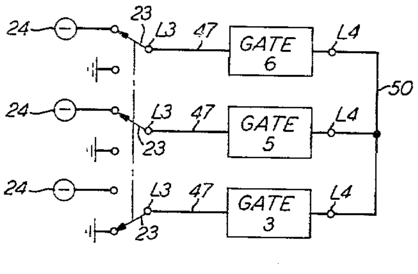
FIG. 7 is a schematic representation of the direct-current equivalent circuit of the switch.

The direct-current control circuit of a switch comprising three gates of the kind shown in FIG 3 is shown in FIG. 7. The controls for switches 23 of of each gate may be interconnected in any well-known manner, as indicated by the dotted line of FIG. 7 so only one switch 23 will be at the ground terminal at any one time. The terminals $L_4$ of all the gates of a switch are tied together by lead 50. Hence, under the conditions shown in FIG. 7, the current from all batteries associated with gates 5 and 6 must flow through gate 3 which, as shown, is connected to ground through its associated switch 23. Furthermore, this must be a current flowing from ground as both gates 5 and 6 are connected to a negative source, therefore gate 3 will be biased into the ON state. In the OFF state of any gate only one diode draws current while in the ON state two diodes draw current. Therefore the entire current flows through an ON gate while only one-half of the current flows through each of the OFF gates thus balancing the control currents required.

Figure 4:
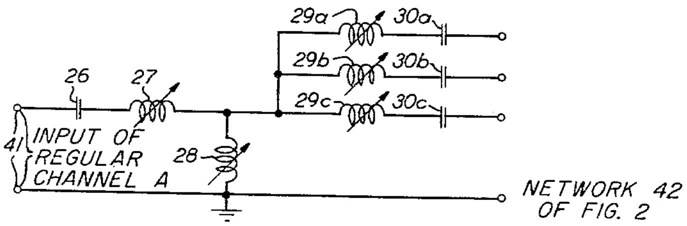
FIG. 4 is a circuit diagram of an interconnecting network which may be used for any of the interconnecting networks, such as network 42, shown in FIG. 2.

A regular channel interconnecting network, corresponding to network 42 of FIG. 2, is shown in FIG. 4 and comprises a series input arm, a shunt arm and three series output arms. The series input arm includes a capacitor 26 in series with a variable inductor 27. The shunt arm includes a variable inductor 28 and the three output arms include variable inductors 29a through 29c in series with capacitors 30a through 30c, respectively. Each of the series output arms of the network is connected to the input terminals $L_1$ of a gate to provide the switch shown in FIG. 2. The series input arm is connected, through terminals 41, to the regular channel carrying the signal energy.

The protection channel interconnecting networks 7 and 8 of FIG. 2 are similar to the regular channel interconnecting network. However, instead of one input arm and three output arms there is only one output arm and six input arms. The elements contained in the series and shunt arms are the same as those in the working channel interconnecting network.

Figure 5:
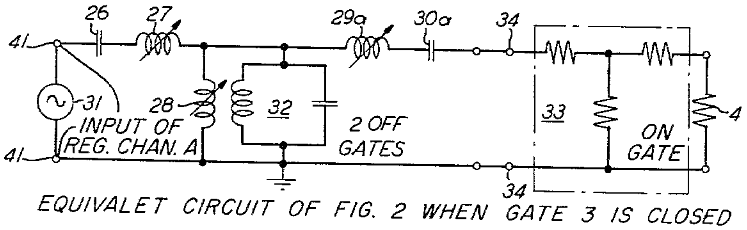
FIG. 5 is a schematic representation of an alternating-current equivalent circuit of the switch of FIG. 2 in its normal state.

As indicated above in connection with FIGS. 2 and 7, at any one time, only one gate of the switch is in the ON state, the other two gates being in the OFF state. Normally, when the associated regular channel is operating, gate 3 of the switch (FIG. 2) will be in the ON state while gates 5 and 6 will be in the OFF state thereby terminating the regular channel branch connected to terminal 41 in resistance 4. The alternating-current equivalent circuit of the switch in this normal state is shown in FIG. 5. The input signal, represented by a source of signal energy 31, is connected to the input of the regular channel interconnecting network.

As noted above, the impedance of an OFF gate may be represented by a parallel LC network. This equivalent impedance of the OFF gates, together with their associated series output arms of the network, denoted by 32, is reflected in parallel with the shunt arm 28 of the interconnecting network thus forming the shunt arm of a bandpass filter, the series output arm connected to the ON gate being the output arm of the interconnecting network. Thus in the present embodiment the impedance of two OFF gates will be reflected into the shunt arm. The ON gate which, as noted above, may be represented by a balanced T-pad network having the characteristic impedance of the transmission line, is shown diagrammatically at 33 and terminates the bandpass filter at terminals 34. Thus, if the impedance of the filter is chosen to equal the impedance of the gate which is equal to the characteristic impedance of the transmission line, the impedance 4 will terminate the structure as shown and mismatching and its attendant disadvantages will be eliminated. Thus the source of signal energy indicated by 31 will "see" a bandpass filter properly terminated in its characteristic impedance. The inductors of the interconnecting networks are made variable to compensate for the differences that may arise in the values of stray capacitance, therefore assuring the characteristics of the filter can be maintained constant.

Figure 6:
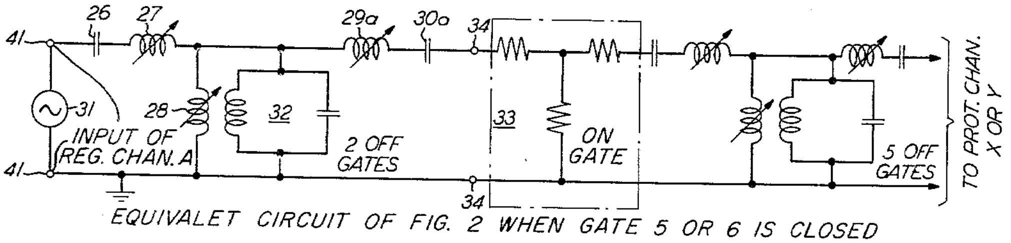
FIG. 6 is a schematic representation of the alternating-current equivalent circuit of the switch of FIG. 2 when a protection channel is in use.

FIG. 6 is the alternating-current equivalent circuit of the structure for the case where a protection channel is utilized due, for example, to the fact that the associated regular channel has failed. It will be noted that the circuit is the same as the bandpass network of FIG. 5 up to terminals 34. The gate represented diagrammatically by 33 is no longer gate 3 but will be gate 5 or 6 depending upon which protection channel is being used. The desired circuit (see FIG. 2) will then be from the input terminal 41, through gate 5 or 6, and through protection channel interconnecting network 7 or 8 respectively to protection channel X or Y. Thus in FIG. 6 terminals 34 will be connected through the schematic representation of a gate 33 to the protection channel interconnecting network. As noted hereinabove, the protection channel interconnection networks have six series input arms. Each input arm is connected to a gate associated with each regular channel switch in the same manner shown in FIG. 2. (It is to be noted the present embodiment contemplates use of six working channels.) Since the protection channel can service only one working channel at any one time, it is obvious that when a protection channel is being used, only one gate connected to the protection channel interconnecting network will be in the ON state, while the other five gates will be in the OFF state. Thus, the impedance of five OFF gates will be reflected into the shunt arm of this interconnecting network thus forming another bandpass structure. The values of the inductors and the capacitors in the interconnecting networks for both the regular channels and protection channels are so chosen to make the center of the passband approximately equal to the center frequency of that band of frequencies it is desired to transmit. Thus, even though there is stray capacitance inherent in the circuit due to the leads and/or the use of semiconductor diodes, which would otherwise place a limit on the highest frequency which could be transmitted, the frequency band has been extended due to the bandpass structures of the present invention.

The output arms of the regular channel interconnecting network and the input arms of the protection channel interconnecting networks may be symmetrically located about the shunt arm of the respective networks. This will minimize the impedance variation from path to path as the stray capacity due to the lead lengths will be approximately equal thereby keeping the possibility of detuning the shunt arms of the bandpass networks to an absolute minimum.

Figure 8:
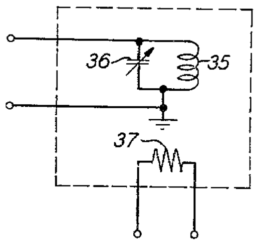
FIG. 8 is a circuit diagram of the gate replacement impedance termination.

In the embodiment described above two protection channels are utilized. However, initially it may be desired to use a transmission system having only one protection channel and to add another at some future date. Likewise, it may also be desired to utilize both protection channels but use less than six regular channels. To eliminate the need for a different switching network in either of the above two cases a provision is made simply to replace the gates not needed with elements having the same alternating-current equivalent impedance as a gate in the OFF state. Therefore the shunt impedance of the bandpass filter is maintained at a constant value insuring proper operation. Such a termination is shown in FIG. 8 and comprises an inductor 35 connected in parallel with variable capacitor 36. These elements are connected to an output arm of a regular channel interconnecting network. Resistor 37 is connected to the battery and other gates and has a value of resistance such that the current drawn by it will equal the current drawn by an OFF gate thereby satisfying biasing conditions. Where fewer than six working channels are used the same network is connected to the protection channel interconnecting network 7 or 8 thus assuring proper shunt impedance of the bandpass filter formed by the other gates of the protection channel and the protection channel interconnecting network.

What is claimed is:

1. In a radio relay station having at least an input channel and a plurality of output channels to carry signal information and a switching means for alternatively connecting the input channel with one of the output channels and connecting at least one of said output channels to a resistor, said switching means comprising a first pair of terminals connected to said input channel, a plurality of second pairs of terminals, series arms and shunt arms having predetermined impedance characteristics so as to constitute a bandpass filter at the signal frequency between said first pair of terminals and each of said second pairs of terminals, a plurality of gate means equal in number to the plurality of output channels operable between a high and a low impedance state and each having a pair of input terminals and a pair of output terminals and presenting to either of said pair of terminals a circuit equivalent to inductance and capacitance in parallel when in the high impedance state and a substantially pure resistance when in the low impedance state, and means connecting the input terminals of each gate individually to a respective second pair of terminals and connecting the output terminals of each gate individually to a different one of said output channels, and biasing means to bias one of said gates into the low impedance state and the other gates into the high impedance state at any one time, whereby in the high impedance state of any gate the impedance across said pair of input terminals thereof appears as a shunt element of the bandpass filter.

2. In a radio transmission system having a plurality of regular channels and at least two protection channels, a bandpass structure associated with each of the plurality of regular channels, comprising first, second and third gates each having nonlinear frequency response characteristics when in a second state and first, second and third networks each exhibiting bandpass filter characteristics at the signal frequency, the first network comprising input terminals and first, second and third paired output terminals, series and shunt arms having frequency determining elements between said input terminals and first, second and third paired output terminals, means connecting the input terminals to one of the plurality of regular channels, means connecting the first, second and third paired output terminals to the first, second and third gates, respectively, the second and third networks comprising output terminals and a plurality of paired input terminals equal to the plurality of regular channels, series and shunt arms having frequency determining elements between the plurality of paired input terminals and the output terminals of the second and third networks, circuit connecting means connecting said second gate to one pair of said plurality of input terminals of the second network and connecting the third gate to one pair of said plurality of input terminals of said third network, means connecting the output terminals of each of said second and third network to a different one of the protection channels, means connecting the first gate to a resistor, and means to bias one of said gates into a first state and the other of said gate into a second state at any one time, whereby said gate in the second state appears as a shunt element of the bandpass structure.

3. A radio transmission system in accordance with claim 2 wherein first means having the same nonlinear frequency response as a gate in the second state is connected to one of said second or third pair of output terminals to replace a gate when less than two protection channels are utilized, whereby said first means appears as a shunt element of the bandpass structure.

4. A switching circuit for connecting a first circuit to any of a plurality of second circuits each having an inherent bandpass characteristic, comprisng an interconnecting circuit including frequency determining elements, said interconnecting circuit being connected to said first circuit, a plurality of gate circuits each connecting said interconnecting circuit to a respective one of said second circuits, an enabled one of said gate circuits providing a substantially resistive impedance between said interconnecting circuit and the respective one of said second circuits, at least one said gate circuits being blocked and providing inductance and capacitance coupled to said frequency determining elements to provide a bandpass characteristic for the combination of said interconnecting circuit and said gate circuits.

5. A switching circuit according to claim 4 in which some of the frequency-determining elements are connected in a T-arrangement including series arms and a shunt arm between the first circuit and the enabled gate, the inductance and capacitance provided by the blocked gate effectively shunting said shunt arm.

6. A switching circuit according to claim 5 including a terminating impedance and an additional gating circuit connecting the interconnecting circuit to said terminating impedance, said terminating impedance being adapted to terminate said interconnecting circuit nonreflectively whenever said additional gating circuit is enabled, said additional gating circuit being enabled whenever the others of said gating circuits are blocked and being blocked whenever any of said other gating circuits are enabled, said additional gating circuit whenever blocked providing inductance and capacitance effectively shunting the shunt arm of said interconnecting circuit.

7. A switching circuit for connecting a first circuit to any of a plurality of second circuits each having an inherent bandpass characteristic, comprising an interconnecting circuit including frequency determining elements, said interconnecting circuit being connected to said first circuit, a plurality of gate circuits each connecting said interconnecting circuit to a respective one of said second circuits, an enabled one of said gate circuits providing a substantially resistive impedance between said interconnecting circuit and the respective one of said second circuits, at least one of said gate circuits being blocked, said blocked gate circuit including a low-pass impedance and a frequency dependent impedance connected with said frequency determining elements and with said low-pass impedance to provide a bandpass characteristic for the combination of said interconnecting circuit and said gate circuits.

8. A switching circuit according to claim 7 in which the gate circuits each comprise a series circuit including first and second asymmetrically conducting devices connected in opposing polarities between the interconnecting circuit and the respective second circuit, said asymmetrically conducting devices providing a first part of the substantially resistive impedance whenever said gate circuit is enabled and providing at least part of the low-pass impedance whenever said gate circuit is blocked, said series circuit including a terminal intermediate said first and second asymmetrically conducting devices and outer terminals, a biasing bus common to all of said gate circuits, a biasing source capable of supplying a plurality of potentials, switch means for selecting one said plurality of potentials, the remainder of said substantially resistive impedance being connected between said switch means and said intermedaite terminal, a bias by-pass connected in parallel with said remainder of said resistive impedance, alternating-current choke devices connected between said biasing bus and respective ones of said outer terminals to provide forward-biasing paths for said asymmetrically conducting devices, at least one of said choke devices comprising the frequency dependent impedance, means for blocking bias from said interconnecting circuit and said respective second circuit, and a third asymmetrically conducting device connected between said biasing bus and said intermediate terminal to provide a reverse-biasing path for said asymmetrically conducting devices.

References Cited by the Examiner

UNITED STATES PATENTS

| | | | |
|---|---|---|---|
| 2,573,257 | 10/51 | Garstang | 325—308 |
| 3,019,402 | 1/62 | Lanctot | 333—97 |

HERMAN KARL SAALBACH, *Primary Examiner.*

BENNETT G. MILLER, *Examiner.*